Figure 1:
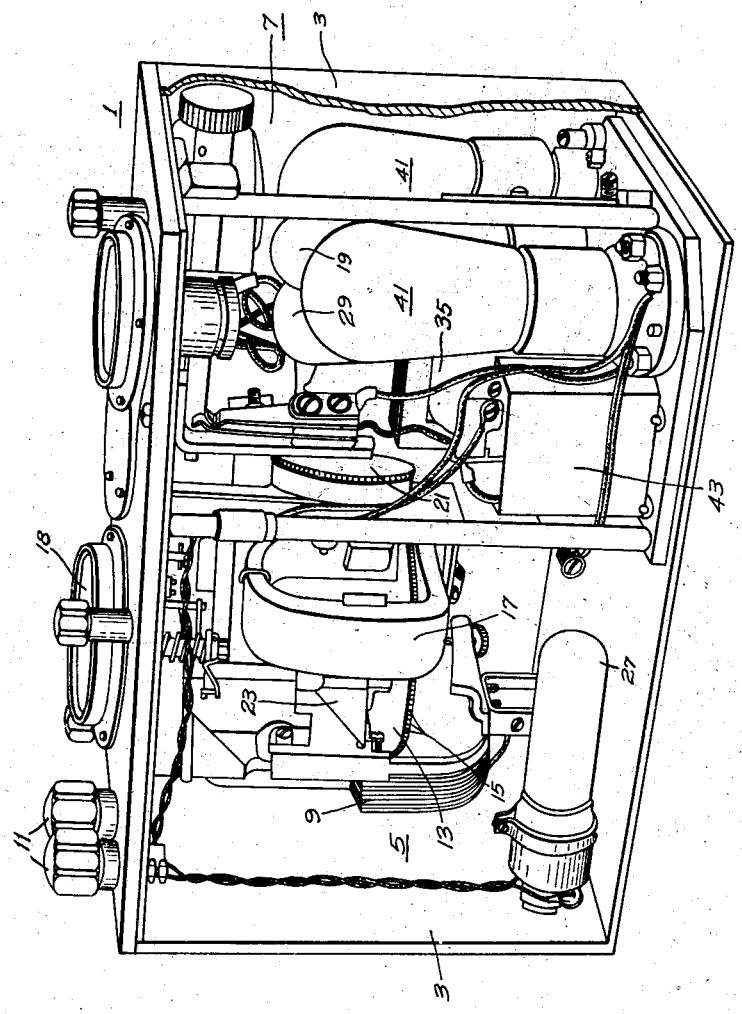

May 7, 1935.　　　D. A. YOUNG　　　2,000,731
METER
Filed Aug. 25, 1932　　　2 Sheets-Sheet 1

WITNESSES:

INVENTOR
Douglass A. Young.
BY
ATTORNEY

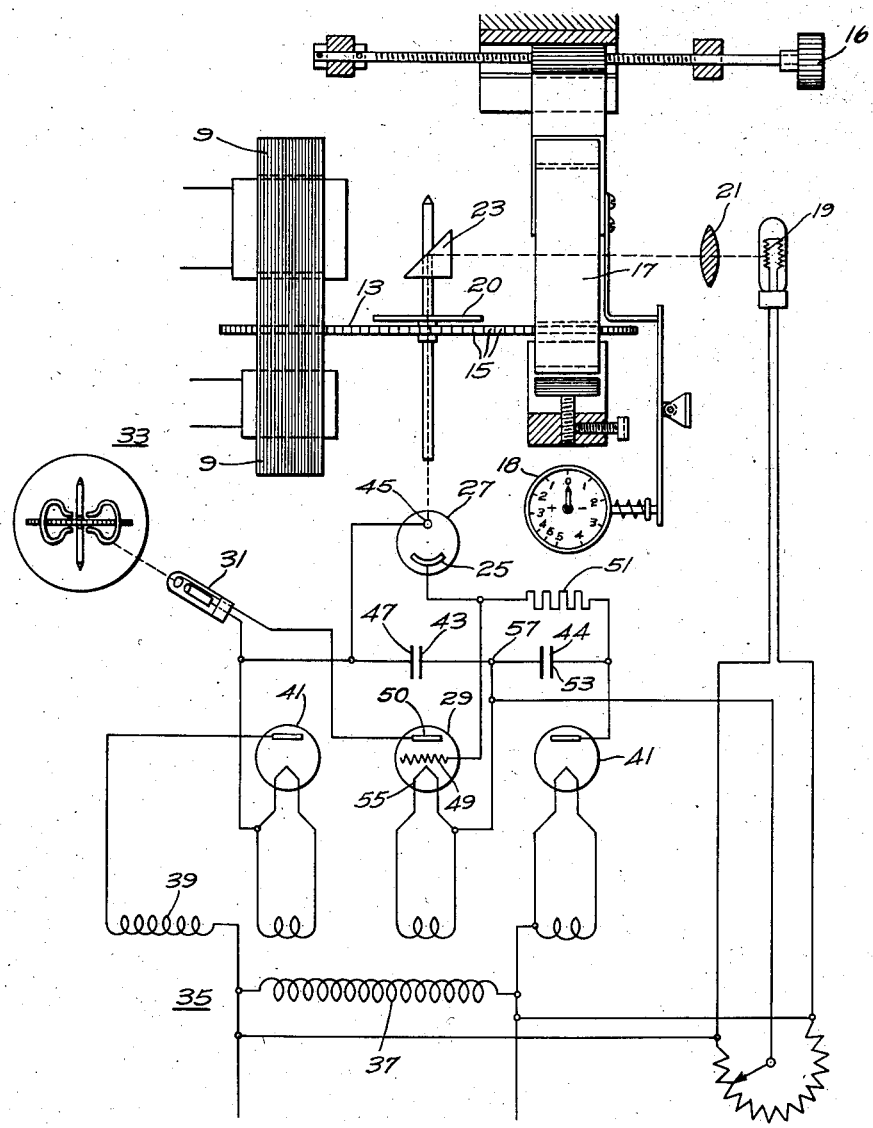

Patented May 7, 1935

2,000,731

UNITED STATES PATENT OFFICE 2,000,731

METER

Douglass A. Young, East Orange, N. J., assignor to Westinghouse Electric & Manufacturing Company, East Pittsburgh, Pa., a corporation of Pennsylvania Application August 25, 1932, Serial No. 630,341

3 Claims. (Cl. 250—41.5)

My invention relates to meter testing apparatus and it has particular relation to portable meter testing apparatus of the type in which the stroboscopic principle is applied for testing purposes.

Portable meter testing apparatus constructed according to the teachings of the prior art, in general, comprises an element to be rotated in response to the application of power and so disposed as to periodically interrupt a beam of light projected from a source to a photo-sensitive device. The photo-sensitive device is so disposed as to receive the beam of light after it has been interrupted by the movable element. The output of the photo-sensitive device is amplified and the output of the amplifier is fed into a suitable luminous device, such as a glow lamp, the radiations from which are projected on the meter to be tested.

When the same source of power is applied to the testing meter and to the meter to be tested, the movable elements of the meter, if the meter under test is accurately adjusted to correspond to the test meter, should move in synchronism. Consequently, the movable element of the meter under test when illuminated by the source energized in accordance with the movement of the movable element of the test meter should appear to be at rest.

The amplifier in the above discussed system, together with the photo-sensitive device and the glow lamp are generally energized from an alternating current power source which is suitably rectified and filtered. In accordance with the teachings of the prior art, the filtering system comprises inductors and capacitors and is generally so bulky that, when it is assembled with the other elements of the apparatus, the combined unit is excessively large.

It is, accordingly, an object of my invention to provide a small and compact stroboscopic test meter.

Another object of my invention is to provide a power supply system for a portable stroboscopic test meter such that the meter including the power supply unit shall be compact.

A further object of my invention is to provide for a test meter a small unit for uniformly supplying power to the detecting, amplifying and indicating elements of the meter.

An incidental object of my invention is to provide a unit for uniformly supplying power of the type wherein the ordinary inductors of a filter are eliminated.

More concisely stated, it is an object of my invention to provide a compact test meter of the type incorporating a photo-sensitive element, an amplifying unit for the photo-sensitive element and an indicating element to be energized from the output of the amplifying element, wherein the detecting element and its appurtenances are energized uniformly from a power supply unit of tractable and compact structure in which the ordinary large and heavy filtering inductors are eliminated.

In accoordance with my invention, I provide a power supply unit for the test meter detector and amplifier which comprises a plurality of rectifiers coupled to a plurality of capacitors in such manner that they charge the capacitors. The indicating element of the test meter and its appurtenances are fed from the capacitors. The capacitors are of such magnitude that the energy which is stored in them by charging is large compared to the energy consumed by the load. However, since in the present case the energy consumed by the glow lamp, the amplifier and the photo-sensitive device is comparatively small, the capacitors need not be of large magnitude and consequently the whole unit may be compact.

The novel features that I consider characteristic of my invention are set forth with particularity in the appendid claims. The invention itself, however, both as to its organization and its method of operation, together with additional objects and advantages thereof will best be understood from the following description of a specific embodiment when read in connection with the accompanying drawings, in which:

Figure 1 is a perspective view showing the essential elements of a watthour meter constructed according to the teachings of my invention, and Fig. 2 is a diagrammatic view showing the circuits and the essential elements associated with the circuit of the meter shown in Fig. 1.

The apparatus shown in the drawings involves many of the elements of the meter shown in the copending application Serial No. 522,303, filed March 13, 1931 to William M. Bradshaw and myself, and comprises a container 1 in which the elements of the test system are disposed. In Fig. 1, the walls 3 of the container are broken away to facilitate the description of the system.

The container 1 is sub-divided into two sections 5 and 7, the elements of the meter being disposed in one section 5, while the element of the power supply unit and the amplifier are disposed in the other section 7.

The meter elements are, in general, similar to the elements of an ordinary watthour meter and comprise an electro-magnetic driving unit 9 which is suitably energized from a power source (not shown), connected thereto through a plurality of external contacts 11. A disk 13 of suitable non-magnetic material is rotatably supported adjacent to the driving element 9 and is rotated when the driving element is energized. The disk 13 is equipped with peripherally cut teeth 15 to be utilized in testing, as shall be explained hereinafter, and its speed of rotation is controlled by an adjustable magnetic brake 17, the position of which may, if desired, be indicated on a meter 18 resiliently coupled to the brake. Brakes of the general type of member 17, i. e. a magnet between the poles of which a conducting disk like 13 moves are well known in the meter art; the eddy currents induced by movement of the disk relative to the magnetflux inducing eddy currents which tend to damp such movement. The brake 17 is moved in a radial direction relative to the disk 13 by rotating the knurled knob 16. The magnitude of this damping or braking action and, therefore, the speed of rotation of the element 13 of the "standard" meter is thus adjusted for a given load on the electrical circuit it is measuring.

A beam of light is projected from a source 19 disposed in the section 7 of the container 1, wherein the amplifying and rectifying elements are located, and is collimated by a lens 21 disposed in the region of the container which separates the two compartments 5 and 7. The beam is deflected at right angles by a totally reflecting prism 23 and thus projected in such manner as to be interrupted by the teeth of the rotating element 13. A grid plate 20 is disposed above the disc 13 and adjacent to the region of the plate where the rays from the source 19 strike it. The plate is equipped with equally spaced rectangular slots (not shown) that correspond to the teeth 15 of the disc 13. When the disc 13 is moved relative to the plate 20 the plate cooperates with the disc to provide the necessary shutter effect.

Thus interrupted by coaction of the plate 20 and disc 13 the beam is projected on the sensitive element 25 of a photo-sensitive device 27 and the fluctuations thus produced in the device 27 are suitably magnified by an amplifier 29. The out-put of the amplifier 29 is connected to a glow lamp 31 and the glow lamp is energized to emit luminous rays which are projected on a meter 33 under test.

The power supply unit comprises an autotransformer 35, the primary 37 of which is coupled to a source of supply of alternating current (not shown) and the output windings 39 of which are connected to energize a plurality of rectifiers 41. A plurality of capacitors 43 and 44 of suitable magnitude are connected in series with the rectifiers 41 in such manner as to be charged when the rectifiers are energized. The anode 45 of the photo-sensitive device 27 is connected to positive plate 47 of the capacitor 43 that is so disposed as to be maintained at the most positive potential and the cathode 25 is connected to the control electrode 49 of the electric discharge device 29 that serves as an amplifier. The control electrode 49 is biased through a resistor 51 of suitable magnitude, one terminal of which is connected to the control electrode 49 while the other terminal is connected to the negative plate 53 of the least positive capacitor 44. The cathode 55 of the amplifying device 29 is connected to an intermediate terminal 57 of the capacitor network, while the anode 58 is connected to the positive plate 47 of the capacitor 43 through the glow lamp 31. The whole system is thus provided with suitable potentials and suitable power from the capacitor system.

It is to be noted that, while in the preferred practice of my invention a high vacuum electric discharge device 29 is utilized for amplifying purposes, my invention is not to be restricted to such a device. Where desirable gas-filled electric discharge devices or any suitable electric discharge devices of other types may be utilized. In particular, it should be noted that, in certain modifications of my invention, the high vacuum device 29 and the glow lamp 31 may be replaced by a single glow device preferably a grid controlled gas filled device (such as a grid glow tube), the glow between the anode and the cathode of which can be utilized for stroboscopic comparison purposes. A system in which such a device is utilized, is an equivalent that lies within the scope of my invention.

The operation of my system is apparent from the above description of the system. The photosensitive device 27 is energized in accordance with the pulsations which it receives through the teeth 15 of the movable element 13 of the test meter. The current impulses thus generated in the photo-sensitive device 27 are amplified by the electric discharge device 29. The amplified current is fed through the glow device 31 which emits luminous radiations in accordance with the impulses received by the photo-sensitive device 27. The energy required for energizing the electric discharge device, the photo-sensitive device and the glow lamp is supplied from the capacitors 43 and 44 which are, in turn, energized through the rectifiers 41. The energy required by the system, is comparatively small and consequently capacitors 43 and 44 of comparatively small magnitude may be utilized in the system.

For the purpose of the present explanation, the capacitors 43 and 44 may be regarded as sources of potential. As the illumination impinging on the photo-sensitive device 27 is varied current pulses are transmitted through the resistor 51 under the electromotive force provided by the capacitors 43 and 44. Corresponding potential pulses are, therefore, impressed between the terminals of the resistor 51 and the potential impressed between control electrode 49 and the cathode 55 of the electric discharge device 29 is correspondingly varied. In consequence of the variations of the control potential impressed on the device 29, the plate current transmitted by the device under the electromotive force provided by the capacitor 43 is varied and the current transmitted by the lamp 31 and its illumination is correspondingly varied. The periodicity of the flashes of the lamp 31, therefore, corresponds to the periodicity of the light impulses impinging on the photo-sensitive device 27.

By the usual calibrating adjustments, the meter 33 which is under test may be adjusted until its movable element rotates at the same speed as the movable element 13 of the "standard" meter in container 1. Or if desired, the brake 17 may be adjusted until the movable element 13 of the "standard" meter rotates at the same speed as the corresponding element of the meter 33; the scale 18 then indicates the amount of change in braking needed to alter the "standard" meter to this speed, and hence indicates the error in meter 33 in its uncalibrated condition.

In a system actually constructed according to the teachings of my invention, 115 volts, 60 cycle alternating current is supplied to the input windings 37 of the transformer 35 which is of the single winding type. The photo-sensitive device 27 is of the type ordinarily utilized in talking motion picture apparatus and in similar equipment and is designated commercially as an SR50 or an SK60 photo cell. The amplifier tube is largely similar to the radiotron UX226 and is often commercially designated as an RJ526 tube. The rectifiers 41 are similar to UX281 radiotrons, the capacitors 43 and 44 have a magnitude of one microfarad each and the resistor 51 in the control circuit of the RJ526 is of the order of 100 megohms.

Although I have shown and described certain specific embodiments of my invention, I am fully aware that many modifications thereof are possible. My invention therefore, is not to be restricted except insofar as is necessitated by the prior art and the spirit of the appended claims.

I claim as my invention:

1. In combination, a network comprising a plurality of capacitors and assymmetric conducting means connected in series, an alternating current source, means for coupling said source to said networks to charge said capacitors, an electric discharge device having a control electrode and a plurality of principal electrodes, means for connecting said principal electrodes between the junction point of said asymmetric conducting means and one of said capacitors and the junction point of said capacitors and means for varying the potentials impressed between said control electrode and said principal electrodes, said means including means responsive to external physical disturbances and means for connecting said responsive means between said control electrode and a junction point of one of said capacitors and said asymmetric conducting means.

2. In combination a network comprising a plurality of capacitors and asymmetric conducting means connected in series, an alternating current source, means for coupling said source to said networks to charge said capacitors, an electric discharge device having a control electrode and a plurality of principal electrodes, means for connecting said principal electrodes between the junction point of said asymmetric conducting means and one of said capacitors and the junction point of said capacitors, means for connecting said control electrode to the junction point of said asymmetric conducting means and another of said capacitors, and means for varying the potentials impressed between said control electrode and said principal electrodes, said means including photo-sensitive means and means for connecting said photo-senitive means to said control electrode and to the junction point of said first-named capacitor and said asymmetric conducting means.

3. In combination, a network comprising a plurality of capacitors and asymmetric conducting means connected in series, an alternating current source, means for coupling said source to said networks to charge said capacitors, an electric discharge device having a control electrode and a plurality of principal electrodes, means including a glow discharge device for connecting said principal electrodes between the junction point of said asymmetric conducting means and one of said capacitors and the junction point of said capacitors, and means for varying the potentials impressed between said control electrode and said principal electrodes, said means including means responsive to an external physical disturbance and means for connecting said responsive means between said control electrode and a junction point of one of said capacitors and said asymmetric conducting means.

DOUGLASS A. YOUNG.